(12) United States Patent
Iwasaki

(10) Patent No.: US 12,293,686 B2
(45) Date of Patent: May 6, 2025

(54) IMAGE PROJECTION APPARATUS AND METHOD OF CONTROLLING THE SAME

(71) Applicant: CANON KABUSHIKI KAISHA, Tokyo (JP)

(72) Inventor: Shogo Iwasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/055,294

(22) Filed: Nov. 14, 2022

(65) Prior Publication Data

US 2023/0169896 A1 Jun. 1, 2023

(30) Foreign Application Priority Data

Nov. 26, 2021 (JP) .................................. 2021-192193

(51) Int. Cl.
*G09G 3/00* (2006.01)
*G06F 3/01* (2006.01)

(52) U.S. Cl.
CPC ............. *G09G 3/001* (2013.01); *G06F 3/013* (2013.01); *G09G 2320/068* (2013.01); *G09G 2340/0464* (2013.01); *G09G 2354/00* (2013.01)

(58) Field of Classification Search
CPC .......... G06F 3/013; G06F 3/011; G09G 3/001
See application file for complete search history.

(56) References Cited

U.S. PATENT DOCUMENTS

| 10,409,146 B2 * | 9/2019 | Sugawara | ............... A61B 3/032 |
| 2021/0141229 A1 * | 5/2021 | Mathur | ............. G02F 1/133528 |

FOREIGN PATENT DOCUMENTS

| JP | H0634873 A | 2/1994 | |
| JP | 2932636 B2 | 8/1999 | |
| JP | H11347016 A | * 12/1999 | ............. A61B 5/117 |
| JP | 2018028579 A | * 2/2018 | ............... G09G 5/00 |

* cited by examiner

*Primary Examiner* — Nelson M Rosario
*Assistant Examiner* — Scott D Au
(74) *Attorney, Agent, or Firm* — Canon U.S.A., Inc. IP Division

(57) ABSTRACT

An apparatus includes a light source configured to emit a light beam based on image data, a projection unit configured to project the light beam onto a pupil of a user, and at least one processor and a memory coupled to the processor storing instructions that, when executed by the processor, cause the processor to function as: an obtaining unit configured to obtain position information on a projection area through which the light beam to be projected onto a retina of the user passes, and a control unit configured to control a projection image to be projected onto the retina with the light beam based on the image data. The control unit controls the light source such that the projection image is changed based on the position information on the projection area and a position of the light beam.

7 Claims, 7 Drawing Sheets

IMAGE PROJECTION APPARATUS AND METHOD OF CONTROLLING THE SAME

BACKGROUND

Technical Field

The aspect of the embodiments relates to image projection apparatuses, and in particular, relates to an image projection apparatus that projects an image onto a retina.

Description of the Related Art

A known image projection apparatus focuses a laser beam for image formation near a pupil of a user to project an image onto a retina of the user. For example, Japanese Patent No. 2932636 discloses an image projection apparatus that scans a laser beam modulated based on an input image to form an image on a retina. Such an image projection apparatus has the following problems. If a focused spot of a laser beam does not substantially coincide with the position of a pupil of a user, the laser beam can be blocked by an iris and fail to reach a retina. In other words, if the user moves their pupil, the user cannot view an image.

Japanese Patent Laid-Open No. 2018-28579 discloses an image projection apparatus that detects the position of a pupil, follows the pupil, and projects an image onto the pupil so that a user can view the image if the user moves their pupil.

In a case where a user would like to gaze at a peripheral portion (particularly, an edge) of an image projected by such an image projection apparatus that projects the image onto a retina of the user so that the user can view the image, the user is likely to move their pupil toward the peripheral portion at which the user would like to gaze. The image projection apparatus disclosed in Japanese Patent Laid-Open No. 2018-28579, which detects the position of a pupil and causes a laser beam to follow the pupil, can project an image onto a retina of a user if the user moves their pupil. However, it is difficult for the user to gaze at a peripheral portion of the image because the projected image follows the moving pupil, in spite of the fact that the user moves their pupil to gaze at the peripheral portion.

SUMMARY

An aspect of the embodiments provides an apparatus including a light source configured to emit a light beam based on image data, a projection unit configured to project the light beam onto a pupil of a user, and at least one processor and a memory coupled to the processor storing instructions that, when executed by the processor, cause the processor to function as: an obtaining unit configured to obtain position information on a projection area through which the light beam to be projected onto a retina of the user passes, and a control unit configured to control a projection image to be projected onto the retina with the light beam based on the image data. The control unit controls the light source such that the projection image is changed based on the position information on the projection area and a position of the light beam.

Further features of the disclosure will become apparent from the following description of exemplary embodiments with reference to the attached drawings.

DESCRIPTION OF THE EMBODIMENTS

Figure 1:
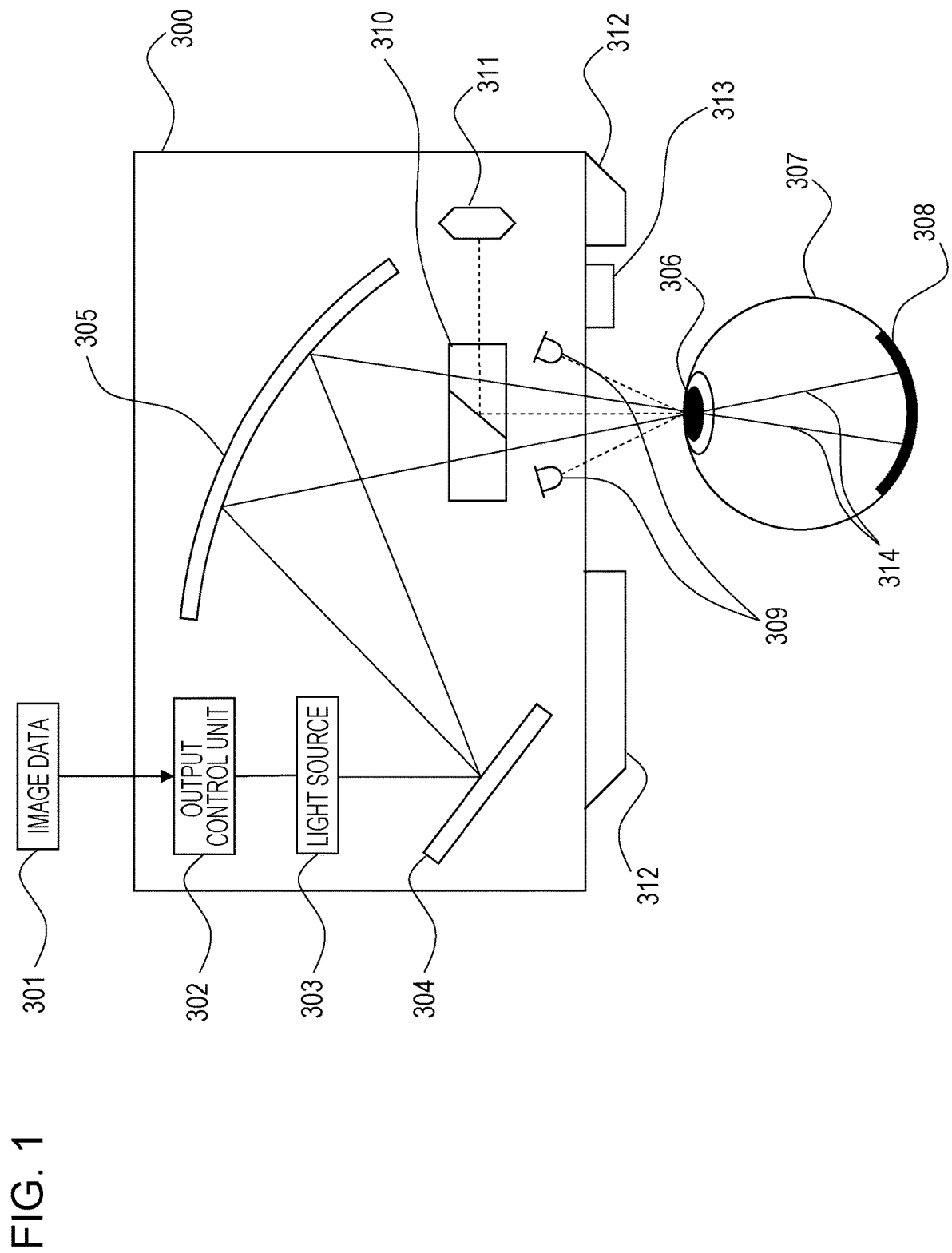
FIG. 1 is a top view of an image projection apparatus according to each of first and second embodiments of the disclosure.

Exemplary embodiments of the disclosure will be described in detail below with reference to the attached drawings. In the figures, the same components are designated by the same reference numerals to avoid redundant description.

First Embodiment

A first embodiment will be described with reference to FIGS. 1 to 4B. FIG. 1 is a top view of an image projection apparatus 300 according to the first embodiment. The image projection apparatus 300 includes an output control unit 302, a light source 303, a scanning unit 304, a projection unit 305, a pupil light emitting unit 309, a light splitter 310, a pupil detection unit 311, an eyepiece 312, and a proximity detection unit 313.

The output control unit 302 includes one or more processors and/or circuitry. The output control unit 302 is a control unit that controls, based on image data 301 generated by, for example, an image capture device or a computer (not illustrated), and input to the image projection apparatus 300, the light source 303 to emit a light beam (hereinafter, referred to as a laser beam 314) of R, G, and B parallel light rays. The output control unit 302 also controls the entire image projection apparatus 300.

The light source 303 includes a light emitting unit and emits the laser beam 314. The laser beam 314 emitted from the light source 303 impinges on the scanning unit 304. The laser beam 314 is scanned two-dimensionally, thus projecting an image. A laser beam into which the input image data 301 is converted may be referred to herein as an image beam.

The scanning unit 304, which two-dimensionally scans the laser beam 314 emitted from the light source 303, can be configured as, for example, a micro-electro-mechanical-system (MEMS) mirror. Changing the angle of the mirror allows the laser beam 314 to be scanned at a predetermined angle. The laser beam 314 scanned by the scanning unit 304 impinges on the projection unit 305.

The projection unit 305 projects the laser beam 314 scanned by the scanning unit 304 onto an eye 307 of a user. The projection unit 305 can be configured as a free-form surface mirror, for example. Furthermore, the projection unit 305 focuses the scanned laser beam (image beam) near a pupil 306 of the user. The laser beam 314 focused at a position that substantially coincides with the position of the pupil 306 passes through the pupil 306 of the user and enters the eye. Scanning the laser beam 314 through the scanning unit 304 scans the image beam over a retina 308, which is a thin layer of tissue at the back of the eye 307, thus projecting an image corresponding to the input image data onto the retina 308. The user identifies, as an image, the image beam scanned over the retina 308 by persistence of vision.

The eyepiece 312 to be in contact with the user is disposed on an outer surface of the image projection apparatus 300 and is located near a viewfinder (not illustrated). The proximity detection unit (proximity sensor) 313, which is used to determine whether the user is in contact with or near the eyepiece 312, is disposed in proximity to the eyepiece 312.

The light splitter 310, the pupil light emitting unit 309 composed of a pair of elements, and the pupil detection unit 311 are arranged inside the image projection apparatus 300. These components are used to detect the position of the pupil 306. When the user looks into the viewfinder of the image projection apparatus 300 to view an image, the position of the pupil 306 of the user is detected by the light splitter 310, the pupil light emitting unit 309, and the pupil detection unit 311. The pupil light emitting unit 309, which includes infrared light emitting diodes, emits infrared light, indicated by broken lines in FIG. 1, to the eye 307 of the user. The light splitter 310 is configured as, for example, a dichroic mirror that transmits visible light and reflects infrared light. The light splitter 310 reflects the infrared light reflected by the eye 307 of the user to the pupil detection unit 311. The pupil detection unit 311 monitors the eye 307 through the light splitter 310 to detect the position (e.g., the coordinates of the center) of the pupil 306 and the diameter of the pupil. Although the light splitter 310 in this embodiment has a reflection plane at an angle of 45 degrees, the reflection plane may be at any angle as long as infrared light can reach the pupil detection unit 311.

For example, Japanese Patent Laid-Open No. 6-34873 describes details of a method of detecting a pupil. An explanation of this method is omitted herein. The above-described configuration enables detection of the position of the pupil 306 and the diameter of the pupil 306. Although the eye 307 is monitored through the light splitter 310 to detect the position of the pupil 306 of the user in the embodiment, the position of the pupil 306 may be detected in any manner. For example, the light splitter 310 may be omitted, and the pupil detection unit 311 may directly determine the position of the pupil 306 of the user.

Figure 2:
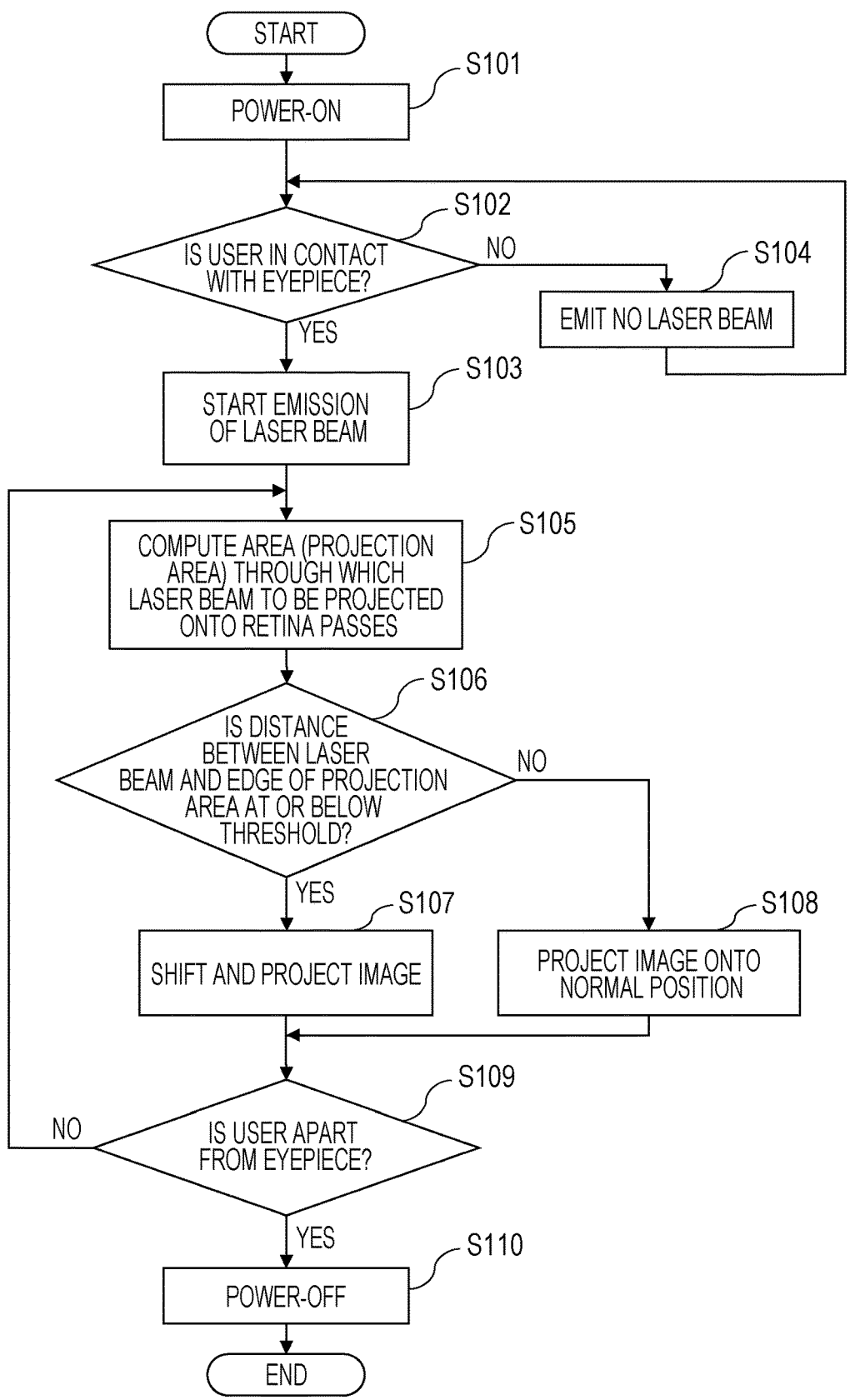
FIG. 2 is a flowchart illustrating a process by an output control unit based on a detection result of a detection unit of the image projection apparatus according to the first embodiment of the disclosure.

Information on the position of the pupil 306 detected in the above-described manner by the pupil detection unit 311 is input to the output control unit 302. The output control unit 302 can compute a distance from the edge of the pupil 306 to the laser beam 314 based on the information on the position of the pupil 306 and the diameter of the pupil 306, the direction of a gaze of the user, and the direction of the laser beam 314 emitted from the light source 303. FIG. 2 is a flowchart illustrating a process by the output control unit 302 based on a detection result of the pupil detection unit 311 of the image projection apparatus 300 of FIG. 1.

The flowchart of FIG. 2 will now be described with reference to FIGS. 3A to 4B. In step S101, the image projection apparatus 300 is powered on in response to a power switch being operated. The output control unit 302 detects power-on of the apparatus and proceeds to step S102.

In step S102, the output control unit 302 determines, based on a detection result of the proximity detection unit 313 disposed in proximity to the eyepiece of the image projection apparatus 300, whether the user is in contact with or near the eyepiece of the image projection apparatus 300. Such proximity may be detected in any manner. For example, the output control unit 302 may determine, based on a detection result of the pupil detection unit 311 instead of the proximity detection unit 313, whether the user is in contact with or near the eyepiece of the apparatus.

In response to determining in step S102 that the user is in contact with or near the eyepiece, the output control unit 302 proceeds to step S103. In step S103, the output control unit 302 controls and causes the light source 303 of the image projection apparatus 300 to emit the laser beam 314 based on the input image data 301.

In response to a determination in step S102 that the user is not in contact with or near the eyepiece, the process proceeds to step S104, where the light source 303 is not caused to emit the laser beam 314. The process returns to step S102 and is on standby until it is determined that the user is in contact with or near the eyepiece. In the embodiment, as described above, in response to a determination that the user is not in contact with or near the eyepiece, the emission of the laser beam 314 is not performed to save power.

In step S103, the emission of the laser beam 314 is started. The process then proceeds to step S105.

In step S105, the output control unit 302 controls and causes the pupil detection unit 311 to detect the position of the pupil 306 of the user and the diameter of the pupil 306, and obtains a detection result. The output control unit 302 then computes, based on the detected position of the pupil 306 and the detected diameter of the pupil 306, the position and size of a projection area (first area) 351, through which a laser beam that can pass through the pupil 306 and project an image onto the retina 308 of the user passes.

Figure 3A:
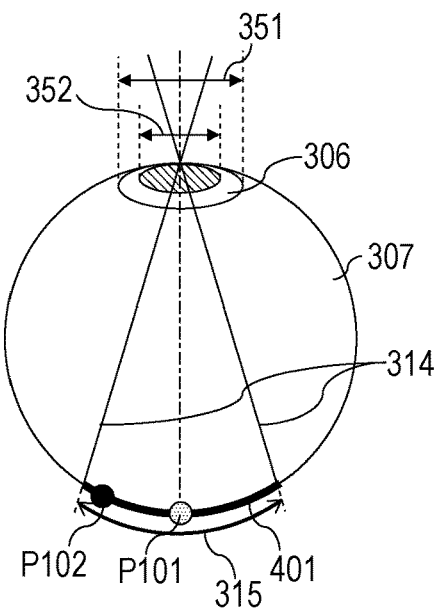
FIGS. 3A to 3C are schematic diagrams illustrating a laser beam and the position of a pupil in the first embodiment of the disclosure.
Figure 3B:
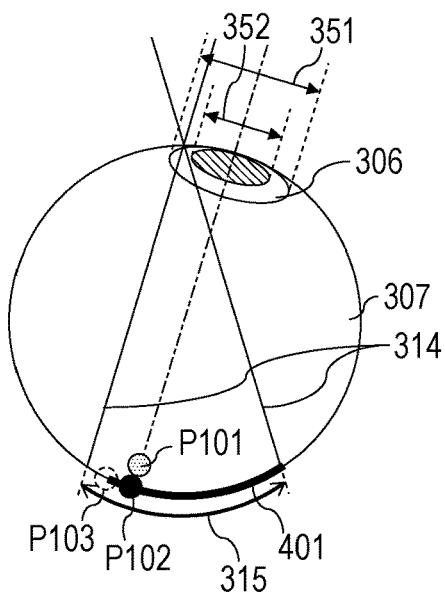
Figure 3C:
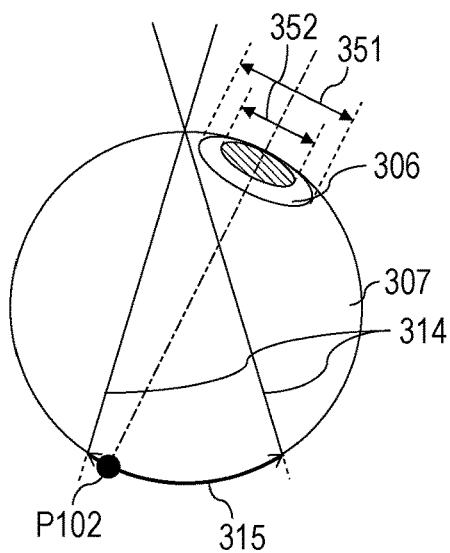

The projection area 351 will now be described with reference to FIGS. 3A to 3C. FIGS. 3A to 3C are schematic diagrams illustrating the laser beam 314 and the position of the pupil 306. The projection area 351 is an area through which a laser beam passes to reach the retina 308 of the user and project an image onto the retina 308. A laser beam passing through the projection area 351 can project an image onto the retina 308, whereas a laser beam that does not pass through the projection area 351 is blocked by the iris (i.e., the edge of the pupil) and fails to project an image onto the retina. FIGS. 3A and 3B illustrate the laser beam 314 passing through the projection area 351. As illustrated in FIG. 3A, the laser beam 314 passes through the projection area 351, reaches the retina 308 of the user, and projects an image onto the retina 308. FIG. 3B illustrates rightward movement of the pupil 306 of the user from the position in FIG. 3A. The rightward movement of the pupil 306 causes the projection area 351 to move rightward. Although the positional relationship (relative positions) of the laser beam 314 and the projection area 351 changes, the laser beam can pass through the projection area 351, reach the retina 308, and project an image onto the retina. FIG. 3C illustrates the laser beam 314 failing to pass through the projection area 351. FIG. 3C illustrates further rightward movement of the pupil 306 of the user from the position in FIG. 3B. The rightward movement of the pupil 306 causes the projection area 351 to move rightward. The positional relationship between the laser beam 314 and the pupil 306 changes, and the laser beam 314 does not pass through the projection area 351. Thus, the laser beam 314 is blocked by the iris, and fails to pass through the pupil and project an image onto the retina 308.

In the embodiment, the position of the projection area 351 coincides with the position of the pupil 306, and the size of the projection area 351 matches the size of the pupil 306. Whether the laser beam 314 passes through the projection area 351 is determined based on a determination of whether the focused spot of the laser beam 314 is located within the projection area 351.

In step S106, whether a first distance that is a distance between the laser beam 314 and the edge of the projection area 351 is less than or equal to a predetermined threshold is determined based on the position and size of the projection area 351 computed in step S105 and the known direction of the laser beam 314.

As used herein, the term "distance between the laser beam 314 and the edge of the projection area 351" refers to a minimum distance between the focused spot of the laser beam 314 and the edge of the projection area 351. Assuming that the laser beam is radiated in the z direction (vertical direction in FIGS. 3A to 3C), the minimum distance is on the xy plane.

In the embodiment, whether the first distance is less than or equal to the threshold is determined based on a determination of whether the laser beam 314 passes through a second area 352 set within the projection area 351. As illustrated in FIG. 3A, in a case where the laser beam 314 passes through the inside of the second area 352, it is determined that the first distance is greater than the threshold (NO in step S106). In contrast, in a case where the laser beam 314 passes outside the second area 352, for example, as illustrated in FIG. 3B, it is determined that the first distance is less than or equal to the threshold (YES in step S106). Whether the laser beam 314 passes through the inside of the second area 352 is determined based on the positional relationship between the second area 352 and the focused spot of the laser beam. If the focused spot of the laser beam 314 is located within the second area 352, it is determined that the laser beam passes through the inside of the second area. If the focused spot of the laser beam 314 is located outside the second area 352, it is determined that the laser beam does not pass through the inside of the second area, or that the laser beam passes outside the second area. Whether the first distance is less than or equal to the threshold can be determined in any other various manners. For example, the first distance may be computed based on the coordinates of the focused spot of the laser beam, the coordinates of the center of the projection area 351, and the diameter of the projection area 351, and the computed distance may be compared with the threshold in step S106.

If it is determined in step S106 that the first distance is less than or equal to the threshold, the process proceeds to step S107. In step S107, the position of an image (projection image) 401 to be projected is shifted based on a direction in which the distance between the laser beam 314 and the edge of the projection area 351 is minimized. If it is determined in step S106 that the first distance is not less than or equal to the threshold, the process proceeds to step S108, where the image 401 is projected onto a normal position that is not shifted.

Figure 4A:
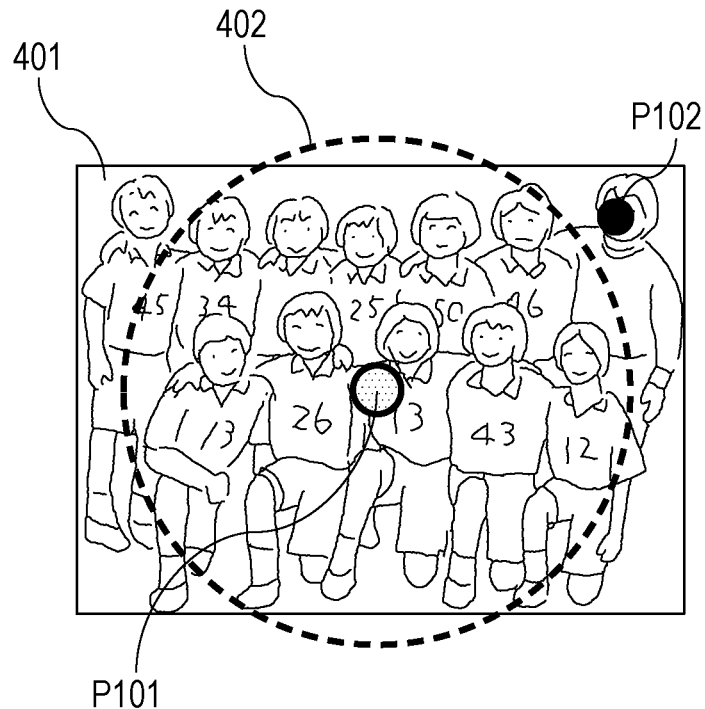
FIGS. 4A and 4B are diagrams illustrating a projection image and the position of a gaze of a user in the first embodiment of the disclosure.
Figure 4B:
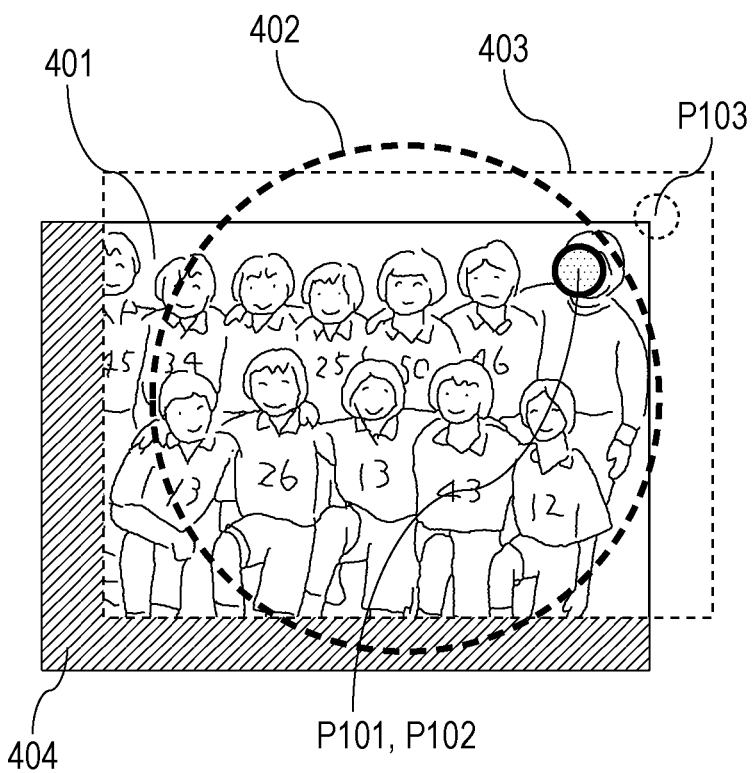

Shifting the projection image 401 will now be described with reference to FIGS. 3A to 4B. FIG. 4A illustrates the projection image 401 projected on the retina 308 of the user with the pupil 306 at the position illustrated in FIG. 3A. FIG. 4B illustrates the projection image 401 projected on the retina 308 of the user with the pupil 306 at the position illustrated in FIG. 3B. In FIGS. 4A and 4B, a gaze position P101 indicates a position at which the user gazes or looks. FIGS. 3A and 4A illustrate a state in which the user is looking at the middle of the image 401, that is, the user is looking forward. A third area 402 surrounded by a dashed line corresponds to the projection area 351, computed in step S105, on the projection image 401. When the gaze position P101 moves out of the third area 402, the laser beam 314 is blocked by the iris, so that the laser beam 314 is not applied to the retina 308 of the user, as illustrated in FIG. 3C.

Information indicating the gaze position P101 and information indicating the third area 402 may be superimposed on the projection image 401 such that the resultant image can be projected onto the user. Since the image obtained by superimposing the gaze position P101 and the third area 402 on the projection image 401 in FIGS. 4A and 4B is a projection image, the user can use the gaze position P101 and the third area 402 so as not to accidentally move their gaze out of the third area 402 when moving their gaze. In one embodiment, either one of the gaze position P101 and the third area 402 may be superimposed on the projection image 401. The apparatus can allow the user to select between a normal mode and a superimposition mode.

Referring to FIG. 4A, a point P102, which coincides with the face of a person at the upper right corner of the projection image 401, located near an edge of a peripheral portion of the projection image 401 is projected outside the third area 402 corresponding to the projection area 351. If the user shifts their gaze to the point P102 to fix their gaze at the point P102, the laser beam 314 cannot pass through the projection area 351 and enter the pupil 306 as illustrated in FIG. 3C, so that the user cannot view the projection image 401.

During shift of the user's gaze from the point P101 to the point P102, the laser beam passes through the projection area 351 but does not pass through the second area 352 at a certain time point, at which the laser beam passes through a region between the edge of the projection area 351 and the edge of the second area 352. In the embodiment, the operation in step S106 is performed during the shift of the user's gaze from the point P101 to the point P102 in the projection image 401. If it is determined in step S106 that the first distance is less than or equal to the threshold, the projection image 401 of FIG. 4B, which is shifted in position from the projection image 401 of FIG. 4A, is projected. In other words, the projection image 401 is an image obtained by shifting a projection position 403 of the projection image 401 of FIG. 4A downward to the left. To shift the position of a projection image in the above-described manner, the position of a portion of the image corresponding to the input image data 301 that serves as the projection image 401 may be shifted downward to the left. As illustrated in FIGS. 3B and 4B, the position of the point P102 projected on the retina is also shifted in response to the above-described shift, so that the point P102 is moved into the third area 402. Thus, if the user fixes the gaze position P101 on the point P102, the laser beam 314 can be applied to the retina 308, so that the user can fix their gaze at the face of the person at the upper right corner.

FIGS. 3B and 4B illustrate a point P103, which indicates a projection position of the point P102 before shift of the projection image 401 (i.e., in the state illustrated in FIGS. 3A and 4A). In the embodiment, as described above, the position of a portion that serves as the projection image 401 is shifted as the pupil 306 moves. Thus, the face position of the person at the upper right corner is moved from the point P103 in FIG. 4B to the point P102. FIG. 4B illustrates a fourth area 404, which is displaced outside the portion, serving as the projection image 401, of the image corresponding to the image data 301 by shifting the portion in the above-described manner. Image data corresponding to the fourth area 404 is not converted into a laser beam.

As described above, in the embodiment, in the case where the first distance is less than or equal to the threshold, an image obtained by shifting the original projection image (the projection image 401 of FIG. 4A) is projected. However, as long as the position of at least one part of a peripheral portion of an image (hereinafter, also referred to as an input image) corresponding to the input image data 301 in the case where the first distance is less than or equal to the threshold differs from that in the case where the first distance is greater than the threshold, a projection image may be obtained in any other manner. An area onto which an image is projected on the retina with the laser beam 314 will be referred to as a projected area 315. In the case where the first distance is less than or equal to the threshold, the projection position of at least one part of a peripheral portion of an input image may be closer to the center of the projected area 315 than that in the case where the first distance exceeds the threshold. Referring to FIGS. 3A and 3B, the projection position of the point P102, serving as a part of the peripheral portion of the input image, in FIG. 3B is closer to the center of the projected area 315 than that in FIG. 3A, where the first distance is greater than the threshold. Furthermore, reducing the size of the projection image 401 to, for example, display an input image reduced in size can cause the whole of the peripheral portion including the point P102 to be closer to the center of the projected area 315 such that the point P102 is located within the third area 402. For display of a reduced image, a large image cannot be projected in the case where the first distance is less than or equal to the threshold, whereas an image larger than the third area 402 can be projected in the case where the first distance exceeds the threshold. This can increase the number of scenes in which a larger image than an image that is projected such that a projection image is always located within the third area 402 can be projected.

A peripheral portion of an input image is to be a portion other than the middle of the input image. However, in one embodiment, to bring only one part of the peripheral portion close to the center of the projected area 315 as illustrated in FIGS. 4A and 4B, which part (in FIG. 4B, an upper right part) of the peripheral portion is brought close to the center of the projected area 315 is determined based on the detected position of the pupil 306.

To shift the projection image 401 as described in the embodiment, a shift amount may be determined based on the first distance. For example, instead of a determination, based on a determination of whether the first distance is less than or equal to the threshold, of whether to shift the projection image, the shift amount may be determined as follows. If the first distance is less than or equal to a first threshold and exceeds a second threshold, the shift amount may be set to a first amount. If the first distance is less than or equal to the second threshold, the shift amount may be set to a second amount greater than the first amount. If the first distance changes from a value that is less than or equal to the first threshold and exceeds the second threshold to a value that is less than or equal to the second threshold, the projection image 401 is further shifted by the difference between the first amount and the second amount. Whether the first distance is less than or equal to the second threshold can be determined based on an area that is further set within the second area. Furthermore, the first distance may be computed, and the shift amount may be increased as the first distance decreases. As described above, changing the shift amount based on the first distance can prevent a sudden shift of the projection image 401, thus reducing an unpleasant sensation experienced by the user.

The projection image 401 may be changed based on the first distance at least in the case where the laser beam 314 passes through the projection area 351. In the case where the laser beam 314 does not pass through the projection area 351, the projection image 401 does not need to be changed (shifted or reduced) based on the first distance.

Then, the process proceeds to step S109. In step S109, whether the user is apart from, or not in contact with or near, the eyepiece of the image projection apparatus 300 is determined based on a detection result of the proximity detection unit 313. If it is determined in step S109 that the user is apart from the eyepiece, the process proceeds to step S110, where the apparatus is powered off, thus terminating the process.

If it is determined in step S109 that the user is in contact with or near the eyepiece, the process returns to step S105. The above-described process is repeated until it is determined that the user is apart from the eyepiece or until the user powers off the apparatus.

According to the embodiment, while a large projection image 401 is being displayed, the user can fix their gaze on an edge of the projection image 401. Thus, while the large image is being projected on the user, the user can move their pupil by a small amount to look at the edge of the image.

Second Embodiment

A second embodiment will be described with reference to FIGS. 5 to 7C. In the second embodiment, an image that is projected in a case where a first distance that is a distance between a laser beam 314 and the edge of a projection area 351 is less than or equal to a predetermined threshold differs from an image that is projected in a case where the first distance exceeds the threshold, as in the first embodiment. The second embodiment differs from the first embodiment in that, in a case where the first distance is continuously less than or equal to the predetermined threshold, changing a portion of an input image to be projected is also continued. In other words, in the second embodiment, in the case where the first distance is less than or equal to the predetermined threshold, the input image is projected onto the retina of the user while being scrolled.

The configuration of an image projection apparatus 300 according to the second embodiment is as illustrated in FIG. 1 and is the same as that in the first embodiment. An explanation of the configuration of the image projection apparatus 300 according to the second embodiment is omitted.

Figure 5:
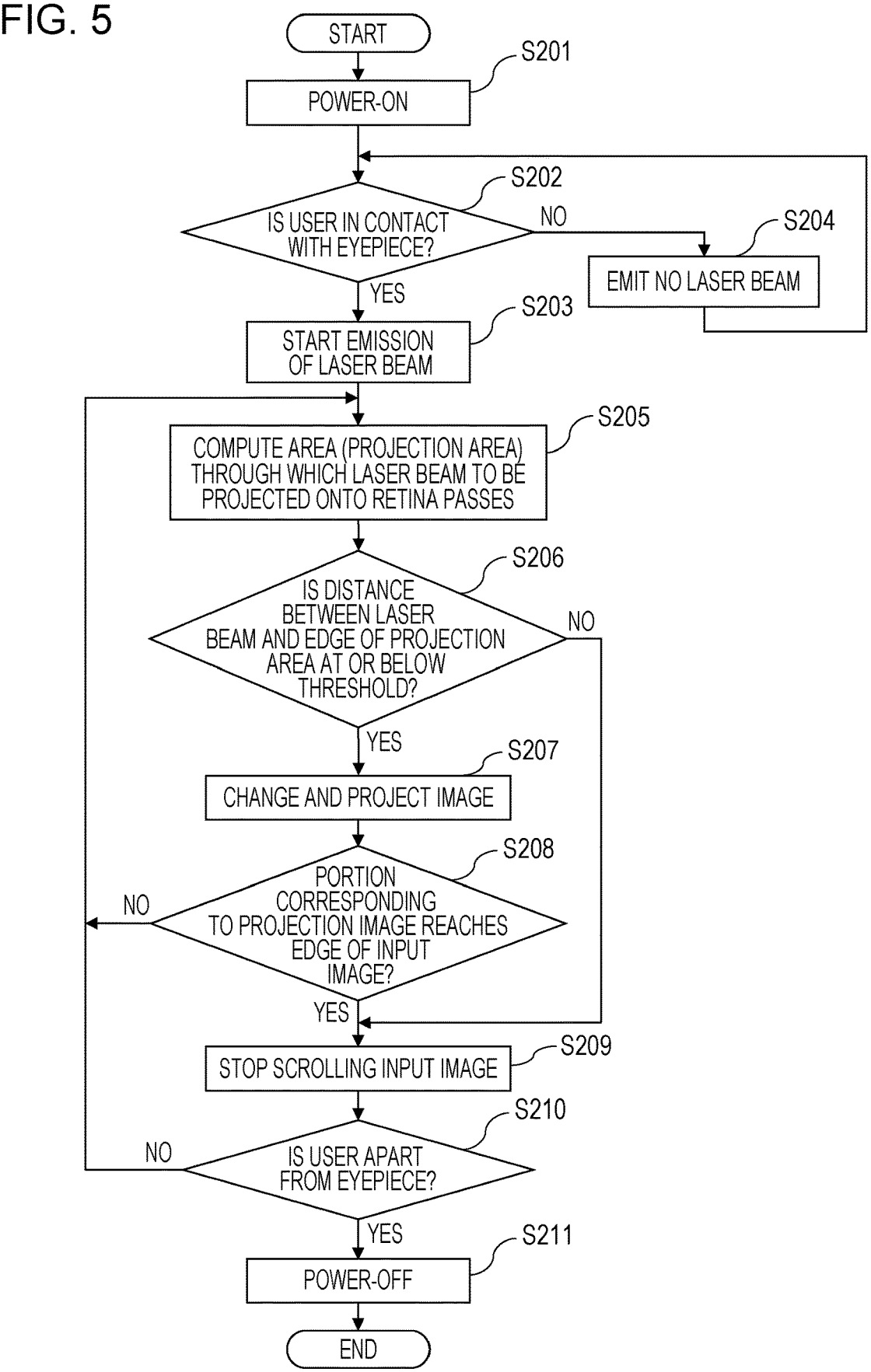
FIG. 5 is a flowchart of a process by an output control unit based on a detection result of a detection unit of the image projection apparatus according to the second embodiment of the disclosure.

FIG. 5 is a flowchart illustrating a process by an output control unit 302 based on a detection result of a pupil detection unit 311 of the image projection apparatus 300 in FIG. 1.

The flowchart of FIG. 5 will be described with reference to FIGS. 6A to 7C.

In step S201, the image projection apparatus 300 is powered on in response to a power switch being operated. The output control unit 302 detects power-on of the apparatus and proceeds to step S202.

In step S202, the output control unit 302 determines, based on a detection result of a proximity detection unit 313 disposed in proximity to an eyepiece of the image projection apparatus 300, whether the user is in contact with or near the eyepiece of the image projection apparatus 300. Such proximity may be detected in any manner. The output control unit 302 may determine, based on a detection result of, for example, the pupil detection unit 311 instead of the proximity detection unit 313, whether the user is in contact with or near the eyepiece of the apparatus.

In response to determining in step S202 that the user is in contact with or near the eyepiece, the output control unit 302 proceeds to step S203. In step S203, the output control unit 302 controls and causes a light source 303 of the image projection apparatus 300 to emit the laser beam 314 based on input image data 301.

In response to a determination in step S202 that the user is not in contact with or near the eyepiece, the process proceeds to step S204, where the light source 303 is not caused to emit the laser beam 314. The process returns to step S202 and is on standby until it is determined that the user is in contact with or near the eyepiece.

In the second embodiment, as described above, in response to a determination that the user is not in contact with or near the eyepiece, the emission of the laser beam 314 is not performed to save power, as in the first embodiment.

In step S203, the emission of the laser beam 314 is started. The process then proceeds to step S205.

In step S205, the output control unit 302 controls and causes the pupil detection unit 311 to detect the position of a pupil 306 of the user and the diameter of the pupil 306, and obtains a detection result. The output control unit 302 then computes, based on the detected position of the pupil 306 and the detected diameter of the pupil 306, the position and size of the projection area 351, as in the first embodiment. In the second embodiment, the position of the projection area 351 coincides with the position of the pupil 306, and the size of the projection area 351 matches the size of the pupil 306, as in the first embodiment. Furthermore, whether the laser beam 314 passes through the projection area 351 is determined based on a determination of whether the focused spot of the laser beam 314 is located within the projection area 351.

In step S206, whether the first distance, which is the distance between the laser beam 314 and the edge of the projection area 351, is less than or equal to the predetermined threshold is determined based on the position and size of the projection area 351 computed in step S205 and the known direction of the laser beam 314. As described above, the term "distance between the laser beam 314 and the edge of the projection area 351" refers to a minimum distance between the focused spot of the laser beam 314 and the edge of the projection area 351.

Figure 6A:
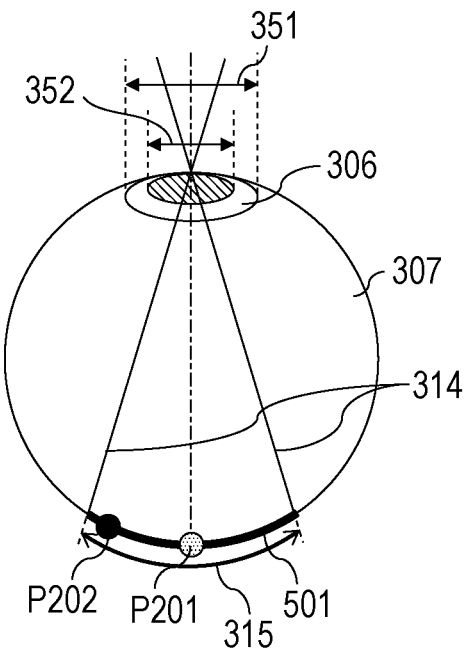
FIGS. 6A and 6B are schematic diagrams illustrating a laser beam and the position of a pupil in the second embodiment of the disclosure.
Figure 6B:
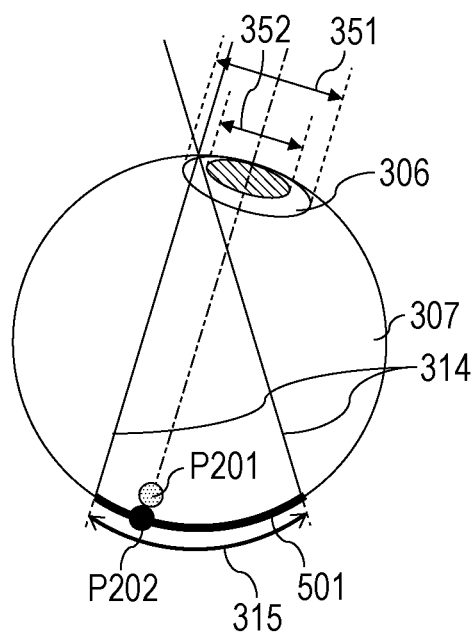

In the present embodiment, whether the first distance is less than or equal to the threshold is determined based on a determination of whether the laser beam 314 passes through a second area 352 set within the projection area 351. As illustrated in FIG. 6A, in a case where the laser beam 314 passes through the inside of the second area 352, it is determined that the first distance is greater than the threshold (NO in step S206). In contrast, in a case where the laser beam 314 passes outside the second area 352, for example, as illustrated in FIG. 6B, it is determined that the first distance is less than or equal to the threshold (YES in step S206). Whether the laser beam 314 passes through the inside of the second area 352 is determined based on the positional relationship between the second area 352 and the focused spot of the laser beam. Whether the first distance is less than or equal to the threshold can be determined in any other various manners, as in the first embodiment.

In response to a determination in step S206 that the first distance is less than or equal to the threshold, the process proceeds to step S207. In step S207, a projection image 501 is changed and projected while an input image is being scrolled based on a direction in which the distance between the laser beam 314 and the edge of the projection area 351 is minimized. Such scrolling of the input image is achieved by changing a portion, serving as the projection image 501, of an image 502 corresponding to the input image in the direction in which the first distance is minimized, or a direction in which the user's gaze moves.

In response to a determination in step S206 that the first distance is not less than or equal to the threshold, the process proceeds to step S209, where the projection image 501 is projected without being changed by scrolling the input image.

Scrolling the input image will now be described with reference to FIGS. 6A to 7C.

Figure 7A:
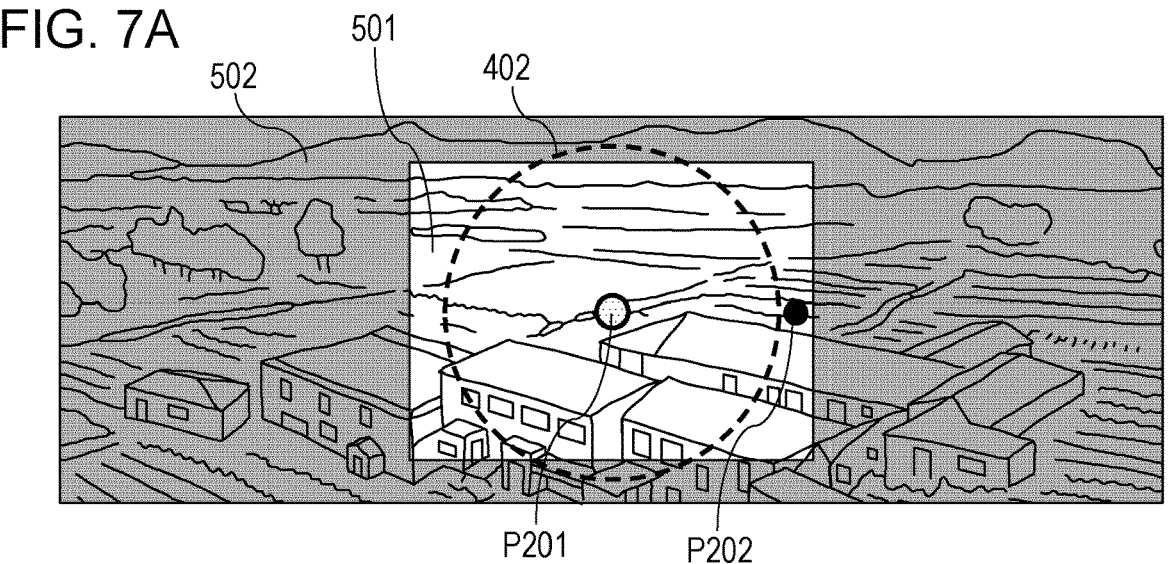
FIGS. 7A to 7C are diagrams illustrating a projection image and the position of the gaze of the user in the second embodiment of the disclosure.
Figure 7B:
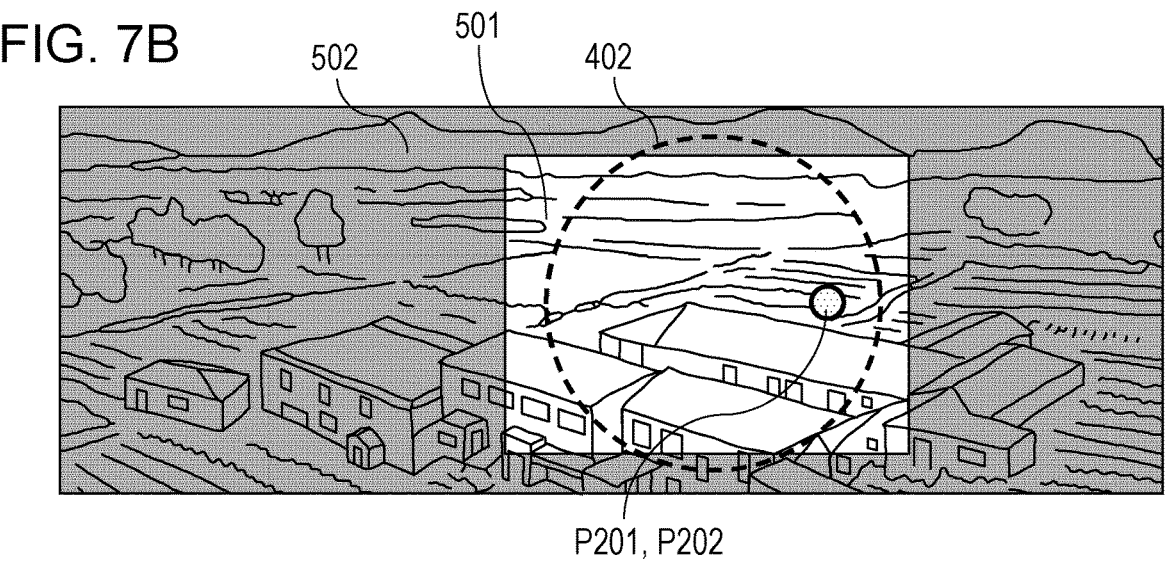
Figure 7C:
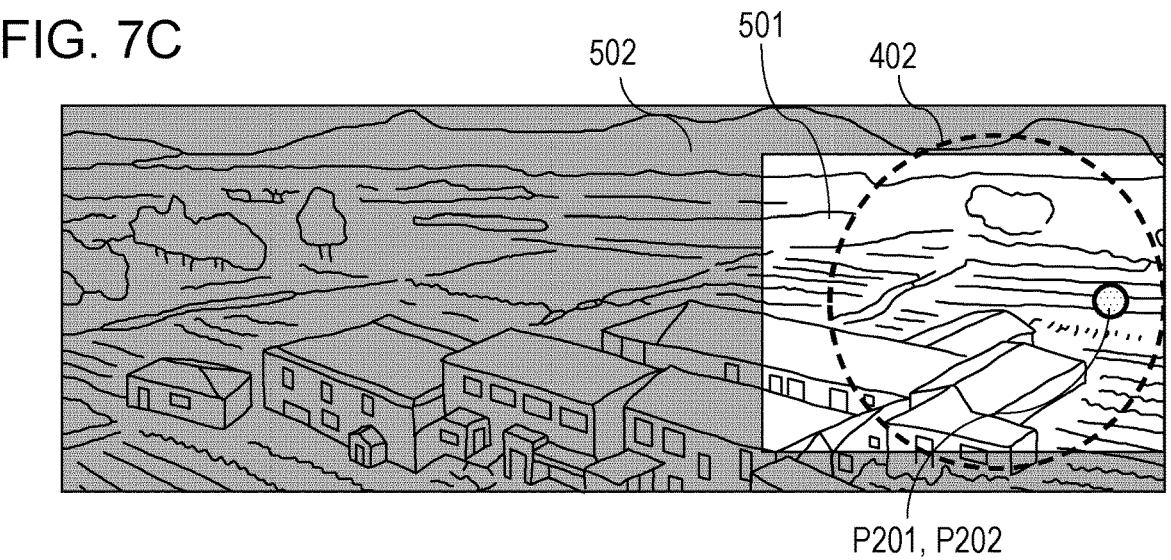

FIG. 7A illustrates the projection image 501 projected on a retina 308 of the user with the pupil 306 at a position illustrated in FIG. 6A. FIG. 7B illustrates the projection image 501 projected on the retina 308 of the user with the pupil 306 at a position illustrated in FIG. 6B. The input image 502 in the embodiment is a panoramic image as illustrated in FIGS. 7A to 7C. In one embodiment, one portion of the image that is obtained by cropping part of the image serves as the projection image 501 projected with the laser beam 314. The projection image 501 is projected onto the user. A gaze position P201 indicates a position at which the user gazes or looks. FIGS. 6A and 7A illustrate a state in which the user is looking at the middle of the projection image 501, that is, the user is looking forward. A third area 402 surrounded by a dashed line corresponds to the projection area 351 computed in step S205, as in the first embodiment. In other words, when the gaze position P201 moves out of the third area 402, the laser beam 314 is blocked by the iris, so that the laser beam 314 is not applied to the retina 308 of the user. The gaze position P201 and the third area 402 may be superimposed on the projection image 501 such that the resultant image can be projected onto the user, as in the first embodiment.

In a peripheral portion of the projection image 501, a point P202 in proximity to an edge of the projection image 501 is located outside the third area 402 indicating the projection area 351. If the user fixes their gaze on the point P202, the laser beam 314 can fail to pass through the projection area 351, so that the user cannot view the projection image 501.

During shift of the user's gaze from the point P201 to the point P202, the laser beam passes through the projection area 351 but does not pass through the second area 352 at a certain time point, at which the laser beam passes through a region between the edge of the projection area 351 and the edge of the second area 352. In the embodiment, the operation in step S206 is performed during the shift of the user's gaze from the point P201 to the point P202. If it is determined in step S206 that the first distance is less than or equal to the threshold, the output control unit 302 shifts the position of a portion that serves as the projection image 501 to the right. Thus, the projection image 501 is a portion illustrated in FIG. 7B. In other words, the projection image 501 is an image obtained by scrolling the input image to the right from the state of FIG. 7A. The position of the point P202 projected on the retina is also shifted toward the center of a projected area 315 as the input image is scrolled, so that the point P202 is moved into the third area 402 indicating the projection area 351. Thus, the laser beam 314 can be applied to the retina 308 of the user fixes the gaze position P201 on the point P202. FIGS. 6B and 7B illustrate a state in which the gaze position P201 coincides with the point P202.

Then, in step S208, whether a portion that serves as the projection image 501 reaches an edge of the input image 502 due to scrolling of the input image is determined. In response to a determination that a portion that serves as the projection image 501 reaches the edge of the input image, the process proceeds to step S209, where scrolling the input image is stopped. In response to a determination in step S208 that a portion that serves as the projection image 501 does not reach the edge of the input image, the process returns to step S205.

FIG. 7C illustrates a state in which a portion that serves as the projection image 501 is further moved to the right from the state of FIG. 7B and reaches a right edge of the input image 502. In this state, if it is determined that the first distance is less than or equal to the threshold, a portion that serves as the projection image 501 is not moved to the right by scrolling the input image to the right, or moving the input image 502 to the left relative to the projection image 501. Scrolling the input image 502 upward, downward, or to the left can be performed depending on a determination because a portion that serves as the projection image 501 does not reach an upper, lower, or left edge of the input image 502.

As described above, a projection image is changed by scrolling an input image based on the first distance. This can reduce the likelihood that the laser beam 314 cannot be applied to the retina 308 of the user if the user fixes their gaze on a position outside the third area 402.

A movement amount (scroll amount) by which a portion that serves as the projection image 501 is moved can be determined based on the first distance. As in the first embodiment, as long as the movement amount increases as the first distance decreases, any method of determining the movement amount may be used. Determining the movement amount based on the first distance can reduce or eliminate rapid scrolling of the input image, thus reducing an unpleasant sensation experienced by the user.

Then, the process proceeds to step S210. In step S210, whether the user is apart from the eyepiece of the image projection apparatus 300 is determined based on a detection result of the proximity detection unit 313. If it is determined in step S210 that the user is apart from the eyepiece, the process proceeds to step S211, where the apparatus is powered off, thus terminating the process.

If it is determined in step S210 that the user is in contact with or near the eyepiece, the process returns to step S205. The above-described process is repeated until it is determined that the user is apart from the eyepiece or until the user powers off the apparatus.

In the embodiment, a portion of the input image 502, which is a large panoramic image, is projected as the projection image 501 onto the retina 308. If the user fixes their gaze on an edge of the projection image 501, the position on which the edge is projected can be moved toward the center of the projected area 315. This can reduce the likelihood that if the user fixes their gaze on the point P202 located in proximity to the edge of the projection image 501 of FIG. 7A, the laser beam 314 may fail to pass through the pupil 306 and the user may fail to view the projection image 501. In addition, while a large image is being projected on the user, the user can move the pupil 306 by a small amount to look at an edge of the image.

Additionally, scrolling to change the projection image 501 can be performed without any cumbersome operation.

The disclosure can provide an image projection apparatus that allows a user to easily gaze at a peripheral portion of an image.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192193, filed Nov. 26, 2021, which is hereby incorporated by reference herein in its entirety.

What is claimed is:

1. An apparatus comprising:
a light source that emits a light beam based on image data;
a detection unit that detects a position of a pupil of a user;
a projection unit that projects the light beam onto the pupil of the user; and
at least one processor and a memory coupled to the processor storing instructions that, when executed by the processor, cause the processor to function as:
an obtaining unit to obtain position information on a projection area through which the light beam to be projected onto a retina of the user passes, and
a control unit to control a projection image to be projected onto the retina with the light beam based on the image data,
wherein the control unit controls the light source such that the projection image is changed based on the position information on the projection area and a position of the light beam,
wherein the obtaining unit obtains, based on the detected position of the pupil, a position of the projection area,
wherein the control unit obtains, based on the detected position of the pupil, the projection area through which the light beam passing through the pupil passes, and
wherein at least in a case where the light beam passes through the projection area, the control unit controls the light source such that the projection image is changed based on a distance between the light beam and an edge of the projection area.

2. The apparatus according to claim 1, wherein the control unit controls the light source such that a position of at least one part of a peripheral portion of an image corresponding to the image data projected on the retina in a case where the distance between the light beam and the edge of the projection area is a first value differs from the position of the at least one part of the peripheral portion of the image corresponding to the image data projected on the retina in a case where the distance between the light beam and the edge of the projection area is a second value greater than the first value.

3. The apparatus according to claim 2, wherein the control unit changes, based on the distance between the light beam and the edge of the projection area, a portion of an image corresponding to the image data, the portion serving as the projection image.

4. The apparatus according to claim 3, wherein the control unit controls the projection image such that the projection image corresponds to a portion of the image corresponding to the image data and such that the portion, corresponding to the projection image, of the image corresponding to the image data is changed based on the distance between the light beam and the edge of the projection area.

5. The apparatus according to claim 4, wherein the control unit controls the projection image such that the image corresponding to the image data is scrolled in a case where the distance between the light beam and the edge of the projection area is less than or equal to a threshold.

6. The apparatus according to claim 1,
wherein the control unit sets a first area that is located within the projection area, and
wherein the control unit controls the light source such that the projection image to be projected in a case where the light beam passes outside the second area differs from the projection image to be projected in a case where the light beam passes inside the second area.

7. A method comprising:
causing a light source to emit a light beam based on image data;
detecting a position of a pupil of a user;
projecting the light beam onto the pupil of the user;
obtaining position information on a projection area through which the light beam to be projected onto a retina of the user passes; and
controlling the light source such that a projection image to be projected onto the retina with the light beam based on the image data,
wherein the controlling controls the light source such that the projection image is changed based on the position information on the projection area and a position of the light beam,
wherein the obtaining obtains, based on the detected position of the pupil, a position of the projection area,
wherein the controlling obtains, based on the detected position of the pupil, the projection area through which the light beam passing through the pupil passes, and
wherein at least in a case where the light beam passes through the projection area, the controlling controls the light source such that the projection image is changed based on a distance between the light beam and an edge of the projection area.

* * * * *